United States Patent [19]
Afendykiw et al.

[11] 3,943,514
[45] Mar. 9, 1976

[54] DUAL BASE LINE INTERFEROMETER ANTENNA

[75] Inventors: Marko Afendykiw, Ann Arbor, Mich.; John M. Boyle, China Lake; Charles E. Hendrix, Pacific Palisades, both of Calif.

[73] Assignee: The United States of America as represented by the Secretary of the Navy, Washington, D.C.

[22] Filed: Nov. 23, 1970

[21] Appl. No.: 92,159

[52] U.S. Cl. .......... 343/16 R; 343/16 M; 343/113 R
[51] Int. Cl.² .................... G01S 3/74; G01S 9/02
[58] Field of Search .......... 343/16 R, 16 M, 113 R, 343/112 R, 12 R

[56] References Cited
UNITED STATES PATENTS

| | | | |
|---|---|---|---|
| 2,546,970 | 4/1951 | Busignies | 343/112 R |
| 2,639,422 | 5/1953 | Harris | 343/112 R |
| 2,971,190 | 2/1961 | Busignies | 343/112 R |
| 3,154,778 | 10/1964 | Kock | 343/5 R |
| 3,303,503 | 2/1967 | Stabilito | 343/16 M X |
| 3,510,871 | 5/1970 | Watanabe et al. | 343/16 R |
| 3,540,054 | 11/1970 | Broderick | 343/113 R |

*Primary Examiner*—Malcolm F. Hubler
*Attorney, Agent, or Firm*—R. S. Sciascia; Roy Miller; Robert W. Adams

[57] ABSTRACT

A radar system for determining the position of a target using a radio frequency source of opportunity. The system uses an interferometer antenna and cross-correlation techniques to measure the time delay in receiving a reflected signal from the target as compared to receiving a direct signal from the signal source. Thereby, the distance from the RF source via the target to the antenna is determined. Additionally, the system uses a plurality of interferometer antennas and cross-correlation techniques to measure the relative phase difference between the signals received by the antennas. Thereby the angle of arrival of the reflected signals from the target is determined. Combining the range and angular information locates the target.

6 Claims, 4 Drawing Figures

DUAL BASE LINE INTERFEROMETER ANTENNA

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention relates to the field of radar for the detection and location of targets. All radar devices require a source of radio frequency energy to provide illumination of targets and a sensor of radio frequency energy to detect echo signals scattered by the targets. In prior devices, called active radar systems, the source of RF energy for target illumination; i.e., the transmitter, is closely associated with and constitutes an integral part of the overall radar system. One of the major problems with active systems is that, by transmitting, they reveal their own location.

SUMMARY OF THE INVENTION

The present invention is a passive radar system that utilizes bistatically located transmitters-of-opportunity as sources of RF energy for target illumination. The system uses interferometer antennas and cross-correlation techniques to detect targets, to measure the time delay between direct and reflected signals, and to enhance the signal-to-noise ratio of detected signals. Since the invention is a passive system it does not have its own RF transmitters and, therefore, will provide tactical information from signals received without revealing its own location.

DESCRIPTION OF THE PREFERRED EMBODIMENT

The object of this invention is to provide an operational passive system capable of detecting, tracking, and ranging aircraft targets. That is, a system capable of performing essentially all of the functions of an active radar, but employing completely uncontrollable and uncooperative transmitters-of-opportunity as target illuminators.

Figure 1:
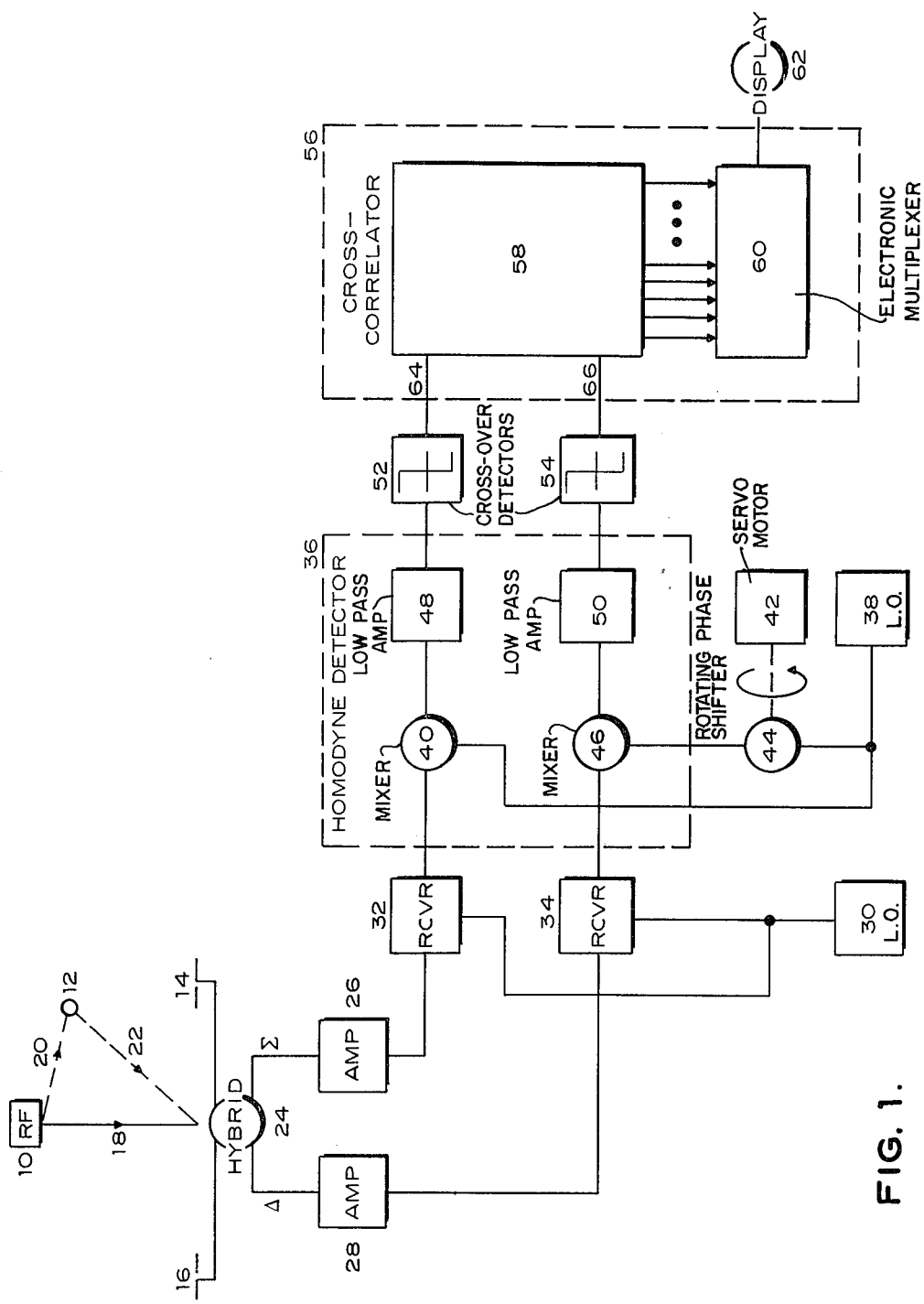
FIG. 1 is a block diagram of the bistatic passive range determining radar system.

Referring to FIG. 1, the bistatic passive range determining radar system comprises a transmitter-of-opportunity (radio frequency source) 10, a target 12, an interferometer antenna having antennas 14 and 16, a hybrid 24 providing a sum channel output to sum channel amplifier 26 and a difference channel output to difference channel amplifier 28, a sum channel receiver 32 and a difference channel receiver 34, a homodyne detector 36, cross-over detectors 52 and 54, a real-time digital cross-correlator 56, and a display 62.

The basic approach to the problem of detecting a target and indicating the target's range is as follows: when a target is present the radiated signal from the transmitter 10 arrives at the receiver, antennas 14 and 16, via two separate paths. The first path 18 is direct from the transmitter to the receiver, while the other, 20 and 22, is a scattered path reflected off target 12. The signal reflected off target 12 travels over a longer path, 20 and 22, and consequently will be delayed in time with respect to the signal received from the transmitter 10 via the direct path 18. Since the transmitter modulation is uncontrollable a method for measuring this time delay is to use cross-correlation techniques.

Cross-correlating the directly received signal with the signal reflected from the target will result in a cross-correlation peak whose position on the display 62 will give the time delay between the two signals and indicate target detection. Knowing the time delay and the velocity of the radio frequency signals the range difference between the direct path 18 and the scattered paths 20 and 22 is easily obtained using simple mathematics and, therefore, will not be discussed. Likewise, if the separation between the receiver and the RF source 10 is known, the total scattered path; i.e., the sum of path 20 and 22 can be obtained. This sum locates the detected target somewhere on the surface of an imaginary prolate spheroid, with the transmitter and the receiver located at the foci of the spheroid.

Again referring to FIG. 1, now in greater detail, the antenna system consists of two turnstile antenna 14 and 16 connected to a wide band hybrid ring 24. Separation between the individual antennas 14 and 16 is adjustable to obtain a desired radiation pattern in the difference channel of the interferometer. The purpose of this type of antenna system is to separate the direct signal 18 received from an RF source from the reflected signal 22 received from a target. The sum and difference channel hybrid outputs are respectively fed to amplifiers 26 and 28 to enhance the system noise figure. Likewise the amplifier outputs are fed to receivers 32 and 34. To insure phase coherence between the sum and difference channels, the local oscillators in both receivers 32 and 34 are locked in phase, as shown by common local oscillator 30 indicated for both receivers.

The output from both receivers 32 and 34 are fed into a homodyne detector where the sum and difference signals are translated down to zero intermediate frequency. A signal from local oscillator 38 is fed to sum channel mixer 40 and, through phase shifter 44, to difference channel mixer 46. Phase shifter 44, driven by servomechanism 42, cancels the Doppler shift associated with the reflected signal from a moving target.

The purpose of the detector is as follows: since range resolution of the system is proportional to the band width of the signal used, the larger the band width the greater the resolution of a system. To take full advantage of the rather narrow band width of, say commercial FM stations (±75kc), it is desirable to correlate between the signals directly from the last I-F before audio detection. Unfortunately, each cycle of the I-F will correlate with any cycle and thus will result in multiple peaks in the cross-correlation function. Translating the signal down to zero intermediate frequency obviates this difficulty. Zero intermediate frequency in each channel is indicated at 48 and 50.

The resultant low-pass sum and difference signals from the homodyne detector 36 are fed through cross-over detectors 52 and 54 and into cross-correlator 56 for processing. Since the cross-correlator 56 used here is a digital machine the two signals are first passed through analog-to-digital converters. The signals are cross-correlated and outputted to display 62. The cross-correlator 56 will be discussed in detail with reference to FIG. 2.

Figure 2:
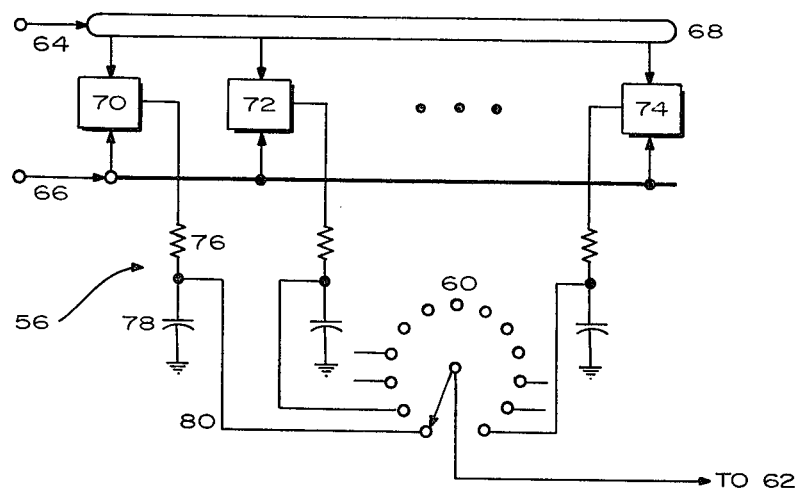
FIG. 2 is a schematic diagram of the cross-correlator of FIG. 1.

Referring to FIG. 2, the cross-correlator 56 is a delay line type correlator. It is a real-time machine that consists of two channels. The first channel is a 500 microsecond tapped delay line 68 into which the signal 64 received directly from the RF transmitter 10 is fed. The other channel is a straight bus having no delay, into which the reflected signal 66 from a target is fed. The delay line 68 is tapped each 5 microseconds.

The output from each delay line tap is multiplied by signal 66 in multipliers 70, 72, and 74, and the resultant product averaged by means of an RC integrating network 76 and 78. The output of the cross-correlator thus consists of a plurality of integrated signals that are scanned sequentially by means of an electronic multiplexer 60 and displayed on the face of a scope 62 for viewing.

When a target 12 is present in the space volume covered by the system, the delayed signal 22 reflected from it will appear in the difference channel 66 of the correlator. This reflected signal will correlate with the direct signal 64 received earlier and held in the delay line 68 over the period of 500 microseconds. The peak of the resultant cross-correlation between the direct 64 and the reflected 66 signals will occur at that point on the delay line 68 that is equal to the time delay of the reflected signal 66 as compared to the direct signal 64.

After the target's range from the receiver has been determined, the angle-of-arrival of the reflected signal is required to pin-point its position. A dual base line interferometer antenna system is used to measure the required angle.

Figure 3:
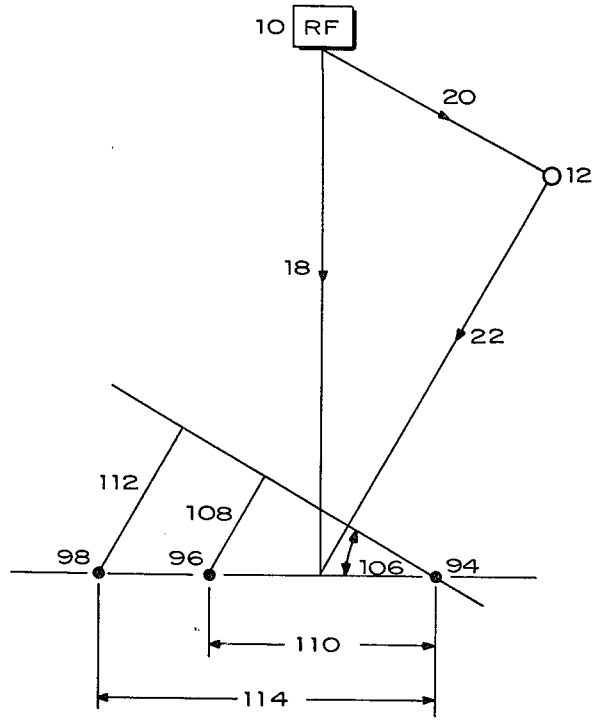
FIG. 3 is a schematic diagram of the antenna arrangement of the dual base line interferometer antenna system.
Figure 4:
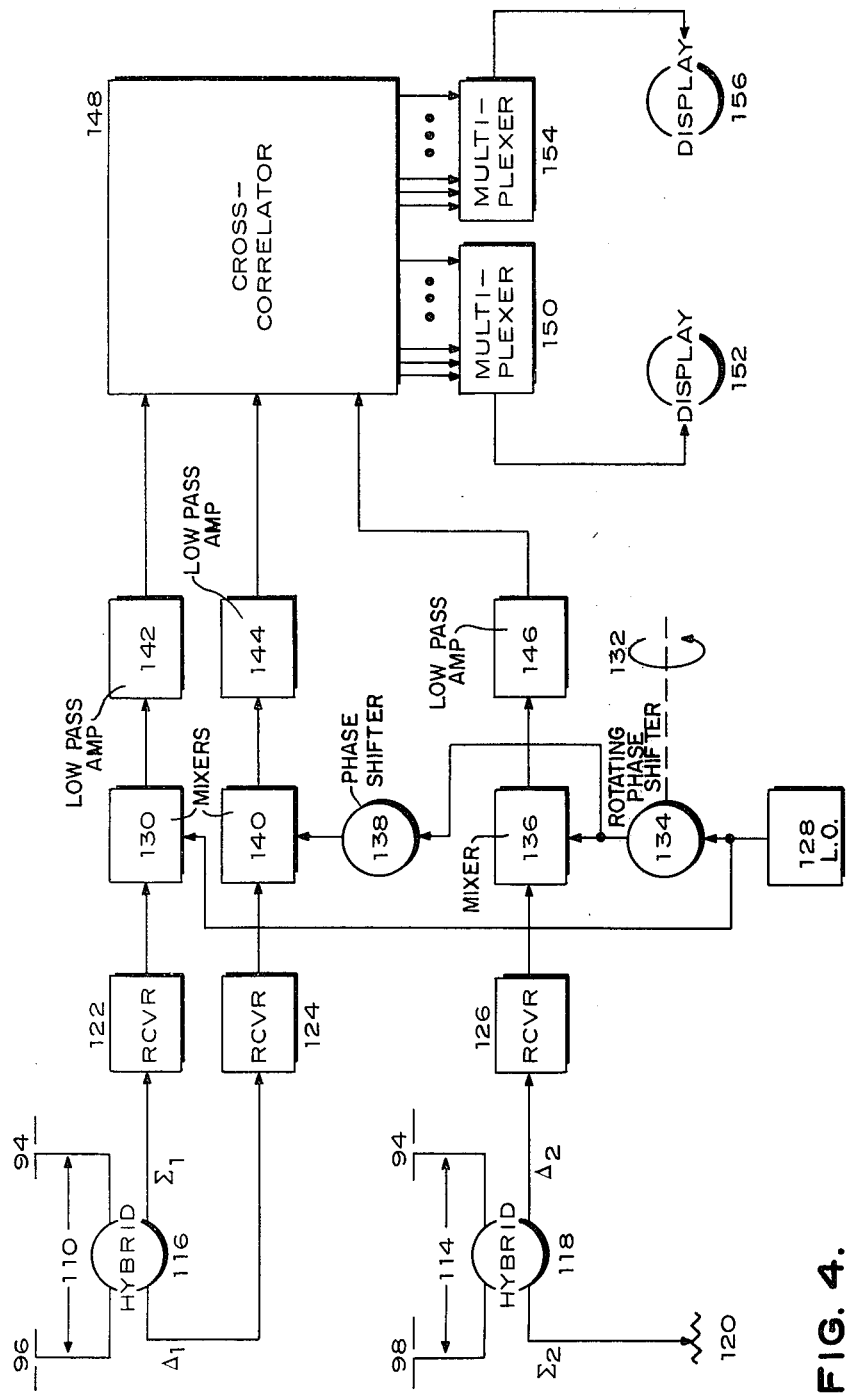
FIG. 4 is a block diagram of the dual base line interferometer antenna system.

Referring now to FIGS. 3 and 4, the dual base line interferometer antenna system comprises a radio frequency source 10, a target 12, a first antenna 94, a second antenna 96, a third antenna 98, an RF source to antenna path 18, an RF source to target path 20, a target to antenna path 22, an angle-of-arrival 106, a second antenna signal delay 108, antennas 1 and 2 separation 110, a third antenna signal delay 112, antennas 1 and 3 separation 114, and the accompanying electronics shown in FIG. 4. The accompanying electronics comprise hybrids 116 and 118, second sum channel dump 120, receivers 122, 124 and 126; local oscillator 128; mixers 130, 136 and 140; phase shifter 134; phase shifter adjustment 138; digital dual channel cross-correlator 148 including multiplexers 150 and 154; and displays 152 and 156.

The antenna system utilizes two interferometers with antenna spacings 110 and 114, and hybrids 116 and 118 which provide the required three channel outputs; one sum channel, in which the direct signal from the illuminating transmitter appears, and two difference channels, in which the signals reflected from the target appears. The three channels' signals are respectively amplified by low noise receivers 122, 124, and 126. The individual local oscillators in receivers 122, 124, and 126 are locked together in phase in order to ensure phase coherence between the three channels. The signals are then heterodyned to zero intermediate frequency and applied to a homodyne detector to remove signal carrier frequency.

Phase adjustment between the two difference channels $\Delta_1$ and $\Delta_2$ is accomplished by phase shifter adjustment 138 in the homodyne detector. The rotating 360° phase-shifter 134, driven by servomechanism 132, is used to cancel the Doppler shift associated with the moving target. Zero intermediate frequency is indicated in each channel by 142, 144, and 146.

The sum ($\Sigma_1$) and the two difference signals ($\Delta_1, \Delta_2$) from the homodyne are fed into the digital cross-correlator for processing. As was done in the device of FIG. 1, the signals are sent to multiplexers (150 and 154) and displays (152 and 156).

The technique for measuring the angle of arrival is as follows: by having two interferometers; antennas 1 and 2, and 1 and 3; the signal reflected from a target 12 appears in the difference channel of each interferometer. Since the separations 110 and 114 between the component antennas of the two interferometers are not equal the relative phase between the reflected signal and the direct signal of the first interferometer will be different from the relative phase difference between the reflected signal and the sum signal of the second interferometer. As a result of the phase inequality the resultant cross-correlation function between the signals at the first interferometer will not fluctuate in a phase with respect to the resultant cross-correlation function between the signals of the second interferometer. By introducing an additional phase into one of the difference channels (reflected signals) the relative phase between the two difference channels can be reduced to zero; i.e., the cross-correlations can be made to fluctuate in phase.

By measuring the phase difference between the two sets of signals; i.e., the correlation required for in-phase fluctuations; the angle of arrival 106 can be determined by the equation below.

$$\alpha = \sin^{-1}\left[\left(\frac{\theta}{\pi}\right)\left(\frac{\lambda}{L_2 - L_1}\right)\right]$$

Where
$\alpha = 0$ angle-of-arrival 106 of the reflected signal
$\lambda$ = wavelength (meters)
$L_2 - L_1 = 114 - 110$
$\theta$ = relative phase between the reflected signal that appears in the two difference channels (phase difference between the two sets of signals)

Therefore, by adjusting the device to obtain traces which are in-phase on displays 152 and 156, and measuring the phase adjustment required by phase shifter adjustment 138, the angle-of-arrival 106 of the reflected signal from target 92 can be measured.

Briefly the operation is as follows: two interferometer antennas of different widths receive a direct signal (sum channel) from an RF transmitter-of-opportunity, and a reflected signal (difference channel) from a target 92. Because of the difference in antenna width, the resultant difference channel signals will not be in phase. One of the difference channel signals is adjusted to bring it into phase with the other difference channel, and the amount of adjustment is measured. The signals are then fed to a dual channel cross-correlator and presented for display. The display indicates the difference in phase between the signals. The amount of phase adjustment is then used to calculate the reflected signals angle-of-arrival.

The combined data obtained from the bistatic passive range determining radar system and the dual base line interferometer antenna system is sufficient to completely specify the target or object location.

What is claimed is:

1. A radar system for passively detecting and tracking targets, wherein said system does not have its own transmitting source, comprising:
- a signal transmitting source-of-opportunity detached from and unassociated with the remainder of said system except as a signal supply;
- a target illuminable by said source;
- a plurality of interferometer antennas for receiving a signal directly from said source and a signal reflected from said target wherein the signals received at each interferometer antenna will have a relative phase relationship;
- means for measuring the relative phase difference between signals received by said antennas; and
- means for converting said relative phase difference into an angle value indicating the directional location of said target from said system.

2. The system of claim 1 wherein said plurality of interferometer antennas consists of two non-rotating interferometer antennas
   comprising first, second, and third antennas.

3. The system of claim 1 wherein said phase difference measuring means comprises:
- a first hybrid electrically coupled to said first and second antennas, providing first and second channel outputs wherein said first channel output is the sum of the signals received and said second channel output is the difference between the signals received;
- a second hybrid electrically coupled to said first and third antennas, providing first and second channel outputs wherein said first channel output is the sum of the signals received and said second channel output is the difference of the signals received;
- means electrically coupled to said first and second hybrids for processing said first and second channel outputs of said first hybrid, and said second channel output of said second hybrid to provide an output useable by a digital cross-correlator;
- a digital cross-correlator electrically coupled to said useable output; and
- display means electrically coupled to said cross-correlator for displaying the output of said cross-correlator;
- such that said display indicates relative phase difference between signals received by said two interferometer antennas.

4. The system of claim 3 wherein said processing means includes;
- means for adjusting the phase of said second channel output of said first hybrid.

5. The system of claim 4 wherein the signal transmitting source-of-opportunity is a radio frequency transmitter.

6. A method of passively detecting and tracking a target comprising;
- receiving signals directly from a radio frequency transmitting source-of-opportunity,
- receiving signals reflected from a target illuminated by signals from said transmitting source-of-opportunity,
- comparing a first set of said direct and reflected signals with a second set of said direct and reflected signals in order to measure the relative phase difference between said sets, and
- converting said relative phase difference into an angle value for indicating the direction from the receiver to the target.

* * * * *